(12) United States Patent
Park et al.

(10) Patent No.: US 12,443,353 B2
(45) Date of Patent: Oct. 14, 2025

(54) MEMORY SYSTEM RESTORING CHANGED DATA AND METHOD OF PROGRAMMING THE SAME

(71) Applicant: SK hynix Inc., Icheon-si Gyeonggi-do (KR)

(72) Inventors: Kang Woo Park, Icheon-si Gyeonggi-do (KR); Myung Su Kim, Icheon-si Gyeonggi-do (KR); Seong Uk Kim, Icheon-si Gyeonggi-do (KR); Beom Seok Hah, Icheon-si Gyeonggi-do (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 1 day.

(21) Appl. No.: 18/410,558

(22) Filed: Jan. 11, 2024

(65) Prior Publication Data
US 2025/0021243 A1 Jan. 16, 2025

(30) Foreign Application Priority Data
Jul. 13, 2023 (KR) .......................... 10-2023-0091214

(51) Int. Cl.
G06F 3/06 (2006.01)
(52) U.S. Cl.
CPC .......... *G06F 3/0625* (2013.01); *G06F 3/0659* (2013.01); *G06F 3/0679* (2013.01)
(58) Field of Classification Search
CPC ..... G06F 3/0625; G06F 3/0659; G06F 3/0679
See application file for complete search history.

(56) References Cited

U.S. PATENT DOCUMENTS

| 2011/0235431 | A1* | 9/2011 | Takagiwa | G11C 11/5642 365/185.22 |
|---|---|---|---|---|
| 2020/0065029 | A1* | 2/2020 | Kim | G06F 3/0625 |
| 2021/0375339 | A1* | 12/2021 | Lien | G11C 7/12 |
| 2023/0282294 | A1* | 9/2023 | Gorobets | G11C 7/106 365/185.22 |
| 2024/0004787 | A1* | 1/2024 | Cariello | G11C 16/26 |
| 2024/0161840 | A1* | 5/2024 | Guo | G11C 16/10 |

FOREIGN PATENT DOCUMENTS

| KR | 1020200139496 A | 12/2020 |
|---|---|---|
| KR | 1020220033368 A | 3/2022 |

* cited by examiner

*Primary Examiner* — Edward J Dudek, Jr.
(74) *Attorney, Agent, or Firm* — WILLIAM PARK AND ASSOCIATES LTD.

(57) ABSTRACT

Provided herein are a memory system and a method of programming the same. The memory system may include a memory device including memory cells for storing data and a plurality of latches for storing code values indicating the data. The memory device may be configured to program data into each of the memory cells, store an original code value indicating the data in the plurality of latches, and change the original code value stored in the plurality of latches to an erase code value in response to a verification pass, and a memory controller configured to output, to the memory device, a suspend command for suspending at least the programming in response to detecting a sudden power-off and a recovery command for restoring a code value changed to the erase code value.

25 Claims, 10 Drawing Sheets

FIG. 6

|  | SENSING LATCH | CODE LATCH | | |
| --- | --- | --- | --- | --- |
|  |  | FIRST LATCH | SECOND LATCH | THIRD LATCH |
| INITIAL STATE |  | 1 | 1 | 1 |
| CHECK ERASE CODE VALUE | 1 | 1 | 1 | 1 |
| COMPARE WITH SEVENTH READ VOLTAGE | 0 | 1 | 1 | 1 |
| COMPARE WITH SIXTH READ VOLTAGE | 0 | 1 | 1 | 1 |
| COMPARE WITH FIFTH READ VOLTAGE | 0 | 1 | 1 | 1 |
| COMPARE WITH FOURTH READ VOLTAGE | 1 | 0 | 1 | 0 |

FIG. 7

|  | SENSING LATCH | CODE LATCH | | |
| --- | --- | --- | --- | --- |
|  |  | FIRST LATCH | SECOND LATCH | THIRD LATCH |
| INITIAL STATE |  | 1 | 0 | 0 |
| CHECK ERASE CODE VALUE | 0 | 1 | 0 | 0 |

MEMORY SYSTEM RESTORING CHANGED DATA AND METHOD OF PROGRAMMING THE SAME

CROSS-REFERENCE TO RELATED APPLICATION

The present application claims priority under 35 U.S.C. § 119 (a) to Korean patent application number 10-2023-0091214 filed on Jul. 13, 2023, in the Korean Intellectual Property Office, the entire disclosure of which is incorporated herein by reference.

BACKGROUND

1. Technical Field

Various embodiments of the present disclosure relate to a memory system, and more particularly to a memory system and a method of programming the memory system.

2. Related Art

A memory system is a device that stores data under the control of a host device, such as a computer or a smartphone. A storage device may include a memory device in which data is stored and a memory controller that controls the memory device. Such memory devices are classified as either a volatile memory device or a non-volatile memory device.

A volatile memory device is a memory device in which data is stored only when power is supplied, and in which stored data is lost when the supply of power is interrupted. Examples of volatile memory devices include a static random-access memory (SRAM) and a dynamic random-access memory (DRAM).

A non-volatile memory device is a memory device in which stored data is retained even when the supply of power is interrupted. Examples of the non-volatile memory device include a read-only memory (ROM), a programmable ROM (PROM), an electrically programmable ROM (EPROM), an electrically erasable and programmable ROM (EEPROM), and a flash memory.

A sudden power-off (SPO) may occur during a program operation of the memory device. The memory device may suspend the program operation and store information related to the suspended program operation in response to the sudden power-off, thus resuming the suspended program operation when power is recovered. The accuracy of the program operation to be performed after power recovery may vary depending on data stored in the memory device until the power of the memory device is turned off.

SUMMARY

Various embodiments of the present disclosure are directed to a memory system and a method of programming the memory system, which restore and store data changed during a program operation in response to the occurrence of a sudden power-off.

An embodiment of the present disclosure may provide for a memory system. The memory system may include a memory device including memory cells for storing data and a plurality of latches for storing code values indicating the data. The memory device may be configured to program data into each of the memory cells, store an original code value indicating the data in the plurality of latches, and change the original code value stored in the plurality of latches to an erase code value in response to a verification pass. A memory controller may be configured to output, to the memory device, a suspend command for suspending at least the programming in response to detecting a sudden power-off and a recovery command for restoring a code value changed to the erase code value. The memory device may be configured to restore the changed code value to the original code value based on a threshold voltage of the memory cell in response to the recovery command.

An embodiment of the present disclosure may provide for a method of operating a memory system, the memory system including a memory device including memory cells for storing data and a plurality of latches for storing code values indicating the data. The memory device may be configured to program data into each of the memory cells, store an original code value indicating the data in the plurality of latches, and change the original code value stored in the plurality of latches to an erase code value in response to a verification pass, and a memory controller configured to generate a control command for controlling the memory device. The method may include detecting a sudden power-off occurring in the memory system; outputting, to the memory device, a suspend command for suspending at least the programming in response to detecting the sudden power-off and a recovery command for restoring a code value changed to the erase code value; and in response to the recovery command, performing a recovery operation including restoring the changed code value to the original code value based on a result of comparing read voltages corresponding to program states of each memory cell with the threshold voltage of the memory cell, respectively.

An embodiment of the present disclosure may provide for a memory system. The memory system may include a memory device including a plurality of memory cells for storing data and a plurality of latches for storing code values indicating the data. The memory device may be configured to perform a first program operation including programming multi-bit data into each of the memory cells, storing an original code value indicating the multi-bit data in a plurality of latches, and changing the original code value stored in the plurality of latches to an erase code value in response to a verification pass within the first program operation, and a memory controller configured to output, to the memory device, a suspend command for suspending the first program operation in response to occurrence of a sudden power-off and a recovery command for restoring a code value changed to the erase code value, among code values stored in the plurality of latches. The memory device may be configured to perform a recovery operation including restoring the changed code value to the original code value based on a threshold voltage of the memory cell in response to the recovery command, dividing the restored original code value into 1-bit units, and programming the 1-bit units into the plurality of memory cells.

An embodiment of the present disclosure may provide for a method of operating a memory system, the memory system including a memory device including a plurality of memory cells for storing data and a plurality of latches for storing code values indicating the data, the memory device configured to perform a first program operation including programming multi-bit data into each of the memory cells, storing an original code value indicating the multi-bit data in the plurality of latches, and changing the original code value stored in the plurality of latches to an erase code value in response to a verification pass within the first program operation, and a memory controller configured to generate a control command for controlling the memory device. The method may include detecting a sudden power-off occurring in the memory system, outputting, to the memory device, a suspend command for suspending the first program operation in response detecting the sudden power-off and a recovery command for restoring a code value changed to the erase code value, among code values stored in the plurality of latches performing a recovery operation of restoring the changed code value to the original code value based on a result of comparing read voltages respectively corresponding to program states of each memory cell with the threshold voltage of the memory cell in response to the recovery command, and performing a second program operation of dividing the restored original code value into 1-bit units and programming the 1-bit units into the plurality of memory cells.

An embodiment of the present disclosure may provide for a memory system comprising a memory device and a controller. The memory device includes a plurality of memory cells for programing data and a plurality of latches for storing bits of the data. The memory device may be configured to store code values of the data whose program operation is interrupted by a sudden power-off in the plurality of latches and restore the code values of the data to original code values of the data before the program operation in response to a recovery command of the controller.

BRIEF DESCRIPTION OF THE DRAWINGS

FIG. 6 is a table illustrating code values stored in a plurality of latches according to an embodiment of the present disclosure.

FIG. 7 is a table illustrating when a code value stored in a plurality of latches is maintained according to an embodiment of the present disclosure.

DETAILED DESCRIPTION

Specific structural or functional descriptions in the embodiments according to the concepts of the present disclosure introduced in this specification or application are provided only for the purpose of describing embodiments according to the concepts of the present disclosure. The embodiments according to the concepts of the present disclosure may be practiced in various forms and the claims should not be construed as being limited to the embodiments described in the specification or application.

Figure 1:
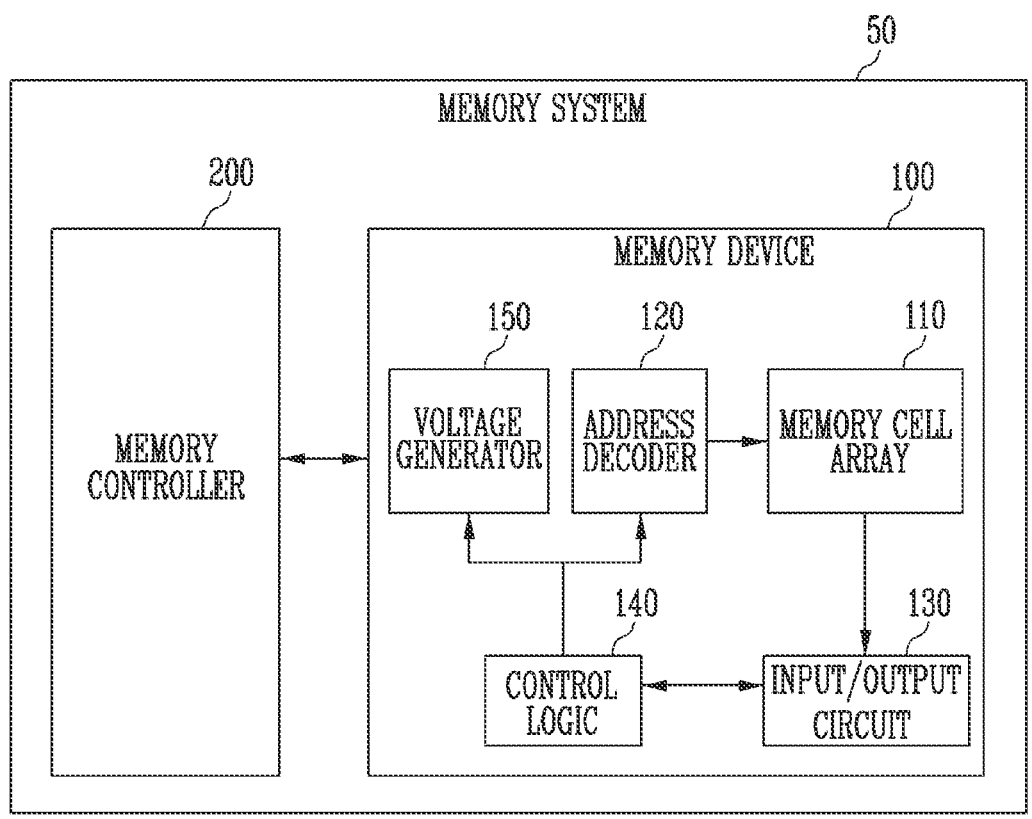
FIG. 1 is a diagram illustrating a memory system according to an embodiment of the present disclosure.

FIG. 1 is a diagram illustrating a memory system according to an embodiment of the present disclosure.

Referring to FIG. 1, a memory system 50 may include a memory device 100 and a memory controller 200 that controls the operation of the memory device 100. The memory system 50 may be a device that stores data under the control of a host, such as a mobile phone, a smartphone, an MP3 player, a laptop computer, a desktop computer, a game console, a television (TV), a tablet PC, or an in-vehicle infotainment system.

The memory device 100 stores data. The memory device 100 may be operated in response to the control of the memory controller 200. The memory device 100 may include a memory cell array 110 including memory cells that store data, an address decoder 120 that decodes a column address, an input/output circuit 130 that transmits/receives data to/from an external system of the memory device 100, control logic 140, and a voltage generator 150 that generates a plurality of voltages having various voltage levels.

Each of the memory cells included in the memory cell array 110 may be a single-level cell (SLC) that stores 1-bit data, or a memory cell that stores multi-bit data. The memory cell that stores the multi-bit data may be a multi-level cell (MLC) that stores 2-bit data, a triple-level cell (TLC) that stores 3-bit data, or a quad-level cell (QLC) that stores 4-bit data depending on the quantity of bits in the multi-bit data. Hereinafter, although the description utilizes an example where each memory cell is a triple-level cell (TLC) for convenience of description, the memory cell is not limited thereto, and may be a multi-level cell (MLC) or a quad-level cell (QLC).

The input/output circuit 130 may include a page buffer that reads data stored in the memory cells and temporarily stores the read data. The input/output circuit 130 may output the data stored in the page buffer to the external system of the memory device 100, or may store data, received from the external system, in the page buffer and then store the data in the memory cells.

The control logic 140 may control the overall operation of the memory device 100. The control logic 140 may control the address decoder 120, the input/output circuit 130, and the voltage generator 150 such that a read operation, a program operation, and an erase operation are performed on the memory cell array 110. The control logic 140 may determine whether a verification result of the program operation indicates a pass.

The memory device 100 may receive a command and an address from the memory controller 200 and may access the area of the memory cell array selected by the address. The memory device 100 may perform an operation indicated by the command on the area selected by the address.

The memory controller 200 may control the overall operation of the memory system 50. The memory controller 200 may control the memory device 100 to perform a program operation, a read operation, or an erase operation in response to a request received from the host.

In an embodiment of the present disclosure, the memory device 100 may perform a first program operation including programming multi-bit data to each of the memory cells. The memory device 100 may store an original code value indicating multi-bit data is programmed into the corresponding memory cell in a plurality of latches.

The memory controller 200 may detect a sudden power-off (SPO) occurring in the memory device 100. An SPO is a power condition that includes, for example, unexpected power loss due to failure or removal of power to the memory system, which typically occurs without warning, such as due to power supply failure, black-out or brown-out conditions for the host of the memory system, accidental or unintentional power removal from the memory system, and so forth. The memory controller 200 may output a suspend command and a recovery command to the memory device 100 in response to detecting the sudden power-off.

The memory device 100 may restore a code value changed depending on the verification pass within the program operation, in response to the recovery command, and may store the restored original code value in each of the plurality of memory cells.

In an embodiment of the present disclosure, when the changed code value is not restored, the memory device 100 needs to again receive and program the original code value. In this case, power required for receiving new data may be insufficient in the event of a sudden power-off situation or condition. Furthermore, when the changed code value that is not restored is programmed, an error correction operation cannot be performed based on the changed code value, thus deteriorating the reliability of a program operation to be performed after power recovery.

Figure 2:
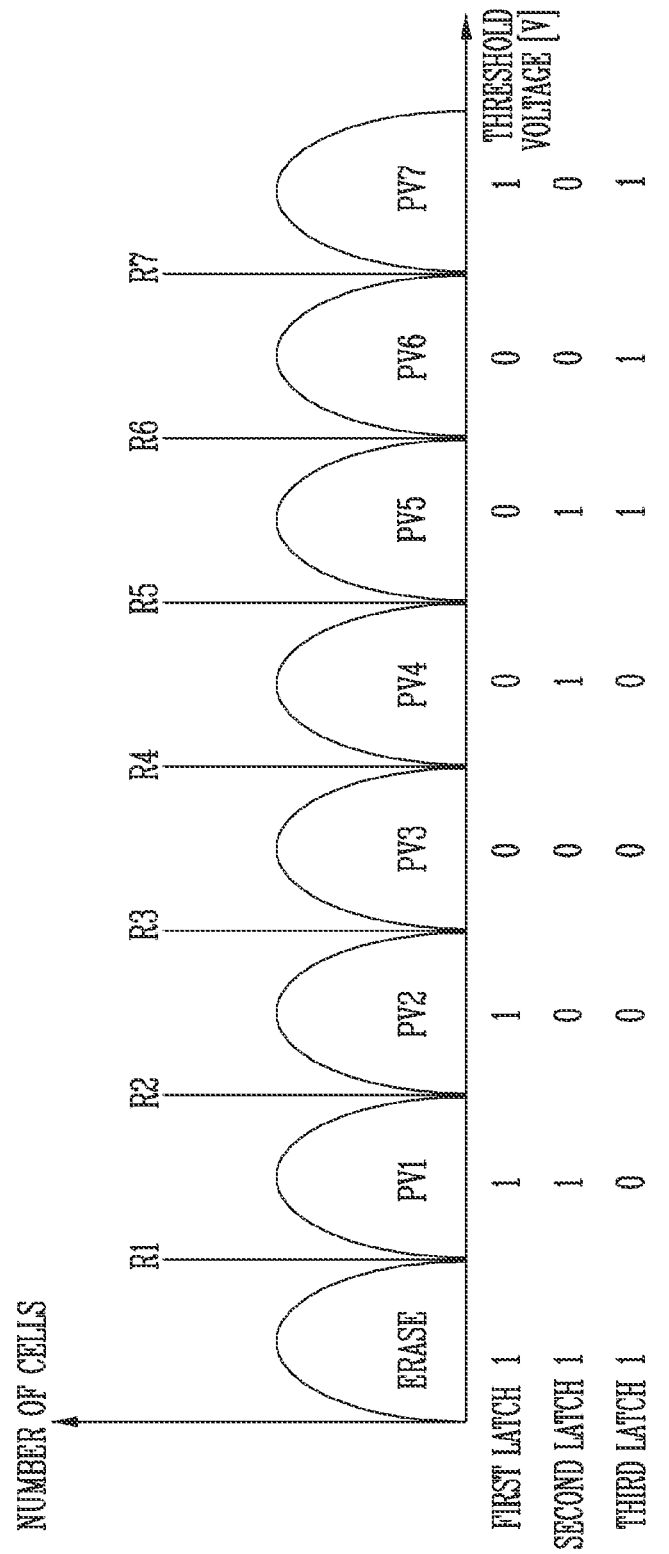
FIG. 2 is a diagram illustrating threshold voltage distributions of triple-level cells and code values stored in a plurality of latches according to an embodiment of the present disclosure.

FIG. 2 is a diagram illustrating threshold voltage distributions of triple-level cells and code values stored in a plurality of latches.

Referring to FIG. 2, the program states of memory cells and code values indicating multi-bit data programmed to the memory cells may be depicted. In the example of FIG. 2, each memory cell is a triple-level cell (TLC) in which 3-bit data is programmed into one memory cell. In FIG. 2, a horizontal axis denotes the threshold voltages of memory cells, and a vertical axis denotes the quantity of memory cells.

The memory cells may have a threshold voltage distribution corresponding to an erase state before a program operation is performed.

Each code value indicating the multi-bit data may be separately stored in a first latch, a second latch, and a third latch. The first latch may store data corresponding to a least significant bit (LSB). The second latch may store data corresponding to a central significant bit (CSB). The third latch may store data corresponding to a most significant bit (MSB).

The code values stored in the first latch, the second latch, and the third latch as illustrated in FIG. 2 are not limited thereto and may vary. Examples of read voltages R1, R2, R3, R4, R5, R6, and R7 and code values, which respectively correspond to program states PV1, PV2, PV3, PV4, PV5, PV6, and PV7 of the illustrated memory cells, are depicted in FIG. 2. For example, the seventh program state PV7 may correspond to the seventh read voltage R7, and a code value corresponding to the seventh read voltage R7 may be 101. '1' may be stored in the first latch, '0' may be stored in the second latch, and '1' may be stored in the third latch.

Figure 3:
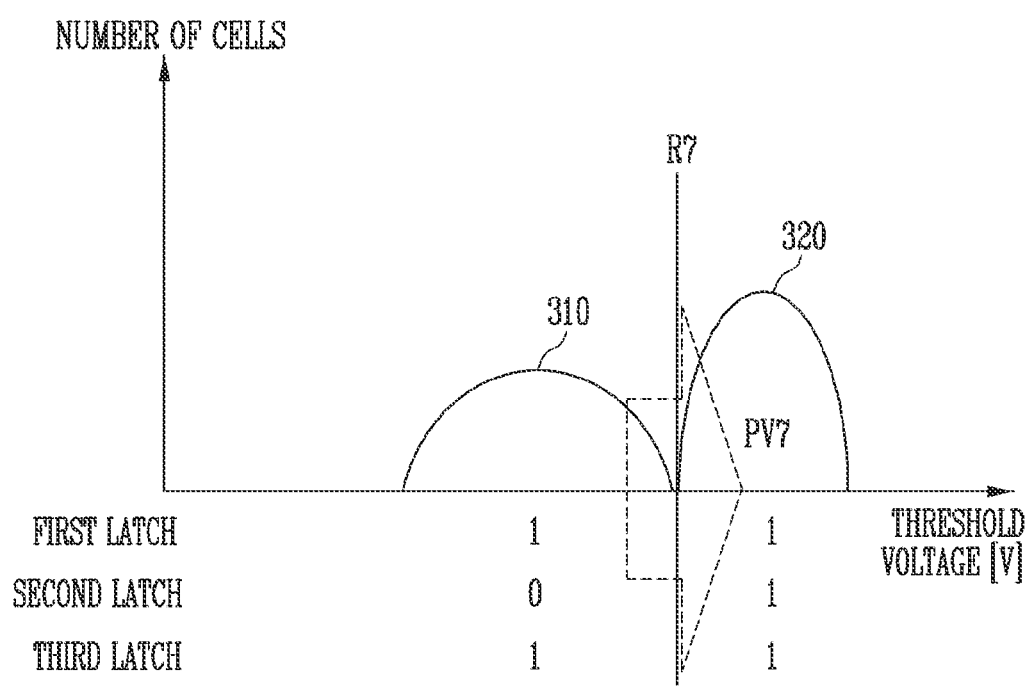
FIG. 3 is a diagram illustrating a code value changed in response to a verification pass within a program operation on triple-level cells according to an embodiment of the present disclosure.

FIG. 3 is a diagram illustrating a code value changed in response to a verification pass within a program operation on triple-level cells.

Referring to FIG. 3, the code value stored in the first latch, the second latch, and the third latch may be changed from 101 to 111 when the threshold voltage distribution 310 of a memory cell being programmed is changed to a seventh program state 320. When the threshold voltage of the memory cell is equal to or higher than the seventh read voltage R7, verification of the program operation performed on the memory cell may pass.

The memory device 100 may change the code value stored in the first latch, the second latch, and the third latch to an erase code value 111 corresponding to an erase state. The change of the code value stored in the first latch, the second latch, and the third latch to the erase code value 111 may indicate that the program operation has been completed. The memory device 100 does not need to store information about whether the program operation has passed in a separate latch by changing the code value stored in the first latch, the second latch, and the third latch, thus saving at least one latch. In an embodiment of the present disclosure, the memory device 100 may indicate whether the program operation on the memory cell has been completed or whether verification within the program operation has passed by changing the code value stored in the first latch, the second latch, and the third latch.

Figure 4:
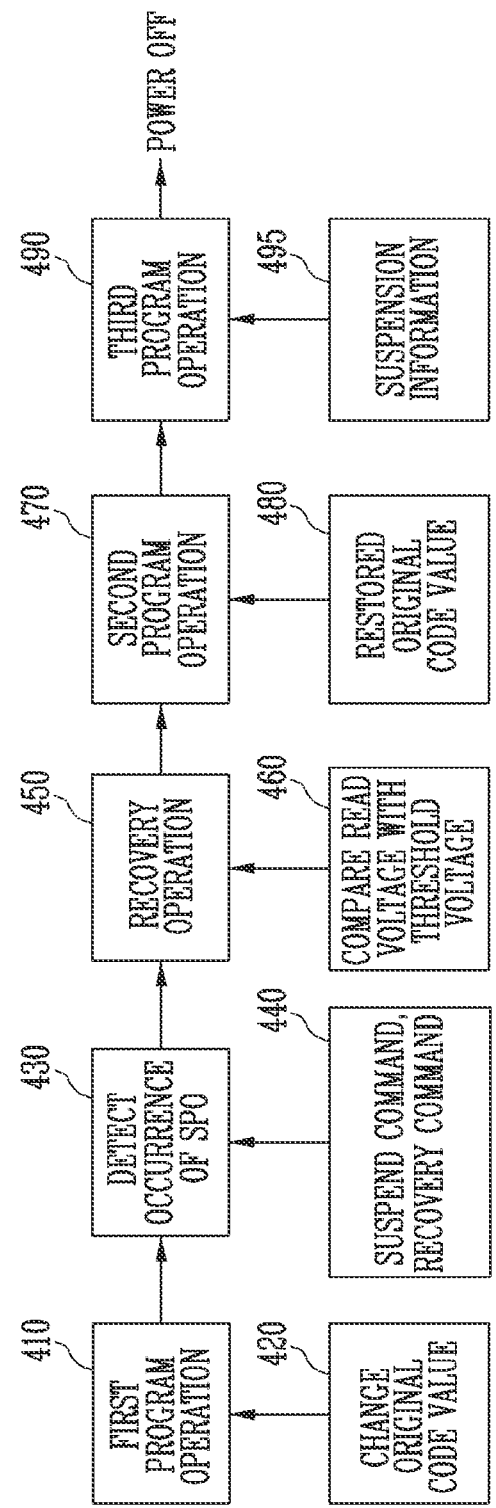
FIG. 4 is a diagram illustrating restoring and programming a code value changed in response to detecting the occurrence of a sudden power-off according to an embodiment of the present disclosure.

FIG. 4 is a diagram illustrating an operation of restoring and programming a code value changed in response to the occurrence of a sudden power-off according to an embodiment of the present disclosure.

Referring to FIG. 4, a memory controller 200 may detect a sudden power-off occurring in a memory system, and a memory device may restore a code value changed due to a program operation and divide the code value into 1-bit units and program the 1-bit units to a plurality of memory cells, respectively. FIG. 4 may operate with the program states of FIG. 2.

The memory device 100 may be configured to perform a first program operation 410 including one or more of the following. Multi-bit data may be programmed into each of the memory cells. The memory device 100 may store an original code value indicating multi-bit data is programmed into the corresponding memory cell in a plurality of latches. The memory device 100 may change an original code value 420 stored in the plurality of latches to an erase code value in response to a verification pass within the first program operation. The erase code value may optionally be a preset or predetermined value.

The memory controller 200 may generate a suspend command for suspending the first program operation in response to detecting the occurrence of a sudden power-off 430 and a recovery command for restoring a code value changed to the erase code value among code values stored in the plurality of latches. In other words, detection of the SPO triggers generation of the suspend command and recovery commend. The memory controller 200 may output the suspend command and the recovery command 440 to the memory device 100.

The memory device 100 may perform a recovery operation 450 including restoring the code value, changed based on the threshold voltage of the corresponding memory cell, to the original code value in response to the recovery command. The memory device 100 may perform the recovery operation based on the result of comparing read voltages corresponding to the program states of the memory cell with the threshold voltage of the corresponding memory cell 460. In response to the threshold voltage of the memory cell that is equal to or higher than a first target read voltage and lower than a second target read voltage that is higher than the first target read voltage, the memory device 100 may restore the changed code value to a code value corresponding to the first target read voltage.

The memory device 100 may sequentially compare read voltages starting from a highest read voltage with the threshold voltage of the memory cell. The memory device 100 may perform the recovery operation until the changed code value is restored or the program state of the memory cell is detected as an erase state. Because the memory cell on which the first program operation is performed is a triple-level cell (TLC) in this example, the memory device 100 may compare the seventh read voltage R7 having the highest level among the read voltages R1, R2, R3, R4, R5, R6, and R7, with the threshold voltage of a target memory cell on which the recovery operation is performed. The memory device 100 may sequentially compare the read voltages with the threshold voltage of the target memory cell in the order of the level (magnitude) of the read voltages until a read voltage lower than or equal to the threshold voltage of the target memory cell among the read voltages R1, R2, R3, R4, R5, R6, and R7 is detected.

In an embodiment of the present disclosure, the plurality of latches in which code values indicating multi-bit data are stored may include a sensing latch that stores information indicating whether the original code value is changed, and code latches that store the original code value or the erase code value. The quantity of code latches may be determined based on the quantity of bits in the multi-bit data. Because the memory cell on which the first program operation is performed is a triple-level cell (TLC) in this example, the quantity of code latches is 3.

The memory device 100 may store a first value in the sensing latch when the code value stored in the code latches is identical to the erase code value. In this embodiment of the present disclosure, the first value may be 1. The memory device 100 may perform a recovery operation on the changed code value in response to the storage of the first value in the sensing latch. In an embodiment of the present disclosure, the memory device 100 may store a second value in the sensing latch and maintain the code value stored in the code latches when the code value stored in the code latches is different from the erase code value.

The memory device 100 may maintain the code value stored in the code latches and store the second value in the sensing latch when the highest read voltage among the read voltages R1, R2, R3, R4, R5, R6, and R7 is higher than the threshold voltage of the target memory cell. In an embodiment of the present disclosure, the second value may be 0. When the value stored in the sensing latch is the second value and the code value stored in the code latches is the erase code value, the memory device 100 may compare the second highest read voltage among the read voltages R1, R2, R3, R4, R5, R6, and R7 with the threshold voltage of the target memory cell. The memory device 100 may maintain the code value stored in the code latches and compare the read voltages with the threshold voltage of the target memory cell until the threshold voltage of the target memory cell is compared with a read voltage lower than or equal to the threshold voltage of the target memory cell. The memory device 100 may restore the changed code value to a code value corresponding to the read voltage lower than or equal to the threshold voltage of the target memory cell.

The memory device 100 may perform a second program operation 470 including dividing the restored original code value 480 into 1-bit units and programming the 1-bit units into the plurality of memory cells. Because the original code value is a 3-bit value, the memory device 100 may divide the 3-bit original code value into three pieces of 1-bit data. The memory device 100 may program each of the pieces of 1-bit data to one single-level cell (SLC). The restored original code value may be programmed into three single-level cells (SLC).

After the second program operation 470, the memory device 100 may perform a third program operation 490 of dividing suspension information 495 related to the suspension of the first program operation into 1-bit units and programming the 1-bit units into the plurality of memory cells in response to the suspend command. The suspension information may include information required for resuming the first program operation suspended due to the sudden power-off after power recovery.

After the restored original code value and the suspension information are programmed to the plurality of memory cells, the power of the memory system may be turned off. Even though the occurrence of the sudden power-off is detected, the memory device 100 may restore the changed code value, program the restored code value, and program the suspension information before power is turned off. An auxiliary power supply may include large-capacity capacitors capable of providing power sufficient to maintain operation after the sudden power-off is detected, which power supports, for example, suspending operation including at least restoring the changed code value, programming the restored code value, and programming the suspension information before power is turned off. The memory device 100 may perform the program operation on single-level cells (SLC) to improve a program speed and reduce power consumed by the program operation.

Figure 5:
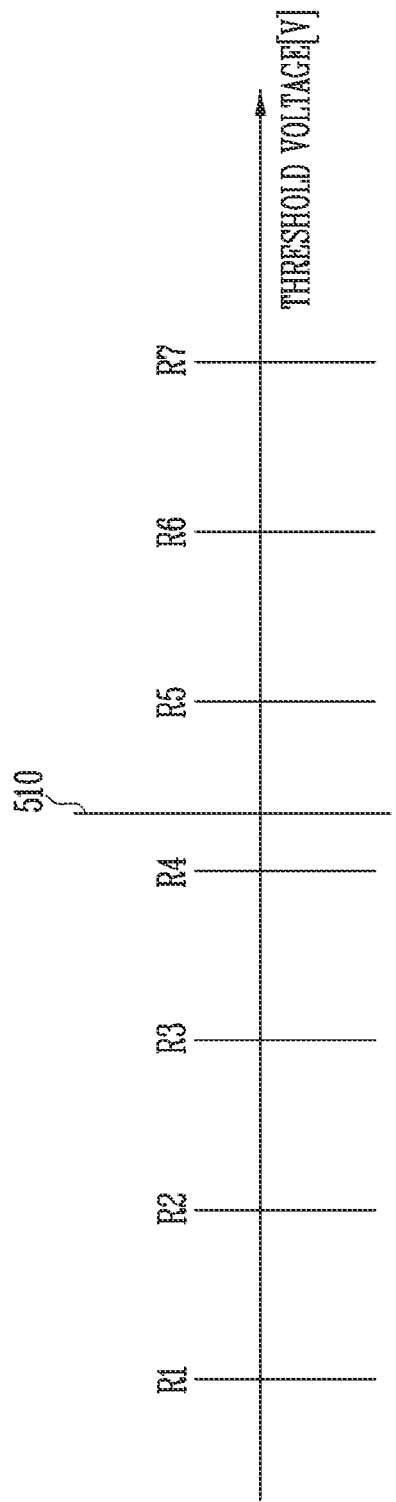
FIG. 5 is a diagram illustrating a target code value restored based on the threshold voltage of a memory cell according to an embodiment of the present disclosure.

FIG. 5 is a diagram illustrating a target code value restored based on the threshold voltage of a memory cell according to an embodiment of the present disclosure.

Referring to FIG. 5, an example of the threshold voltage 510 of a target memory cell in which a code value is restored is depicted. The threshold voltage 510 of the target memory cell may be determined by the program state of the target memory cell. In FIG. 5, the program state of the target memory cell may be a fourth program state PV4.

In FIG. 5, a horizontal axis denotes a threshold voltage. The threshold voltage 510 of the target memory cell is assumed in this example to be equal to or higher than a fourth read voltage R4 and lower than a fifth read voltage R5. The threshold voltage 510 of the target memory cell illustrated in FIG. 5 is only an example provided for convenience of description and may apply to different threshold voltages. The example of FIG. 5 may apply to FIG. 2 and FIG. 3.

Assuming that a program operation on the target memory cell has been completed, an original code value indicating the multi-bit data programmed to the target memory cell may be changed. The original code value may be stored in code latches among the plurality of latches.

The target program state of the target memory cell may be the fourth program state. The original code value may be 010. The memory device 100 may change the original code value to an erase code value 111 based on a verification pass within the program operation on the target memory cell. The memory device 100 may restore the changed code value 111 to the original code value 010 in response to a recovery command.

The memory device 100 may determine whether the code value stored in the code latches is the erase code value 111. The fact that the code value stored in the code latches is not the erase code value 111 may indicate that the program operation on the memory cell has not yet been completed. When the code value stored in the code latches is not the erase code value 111, the memory device 100 may maintain the code value stored in the code latches without change.

When the code value stored in the code latches is the erase code value 111, the memory device 100 may compare the threshold voltage 510 of the target memory cell with a seventh read voltage R7 having the highest level, among read voltages R1, R2, R3, R4, R5, R6, and R7. Because the seventh read voltage R7 is higher than the threshold voltage 510 of the target memory cell, the memory device 100 may compare the threshold voltage 510 of the target memory cell with the sixth read voltage R6. The operation of comparing the threshold voltage 510 of the target memory cell with each of the read voltages R1, R2, R3, R4, R5, R6, and R7 may be performed until the fourth read voltage R4, which is a read voltage lower than the threshold voltage 510 of the target memory cell, is compared with the threshold voltage 510 of the target memory cell.

Because the threshold voltage 510 of the target memory cell is between the fourth read voltage R4 and the fifth read voltage R5, the memory device 100 may determine the original code value of the target memory cell to be 010 in accordance with the example of FIG. 2. The memory device 100 may change the code value of the target memory cell stored in the code latches from 111 to 010.

In FIG. 5, when the threshold voltage 510 of the target memory cell varies, the determined original code value may vary. For example, when the threshold voltage of the target memory cell is higher than the seventh read voltage, the operation of comparing the threshold voltage with the read voltage may be performed only once, and the original code value may be determined to be 101 in accordance with FIG. 2. When the program state of the target memory cell is an erase state ERASE, the operation of comparing the threshold voltage with the read voltage is performed seven times, and the original code value may be determined to be 111.

FIG. 6 is a table illustrating code values stored in a plurality of latches according to an embodiment of the present disclosure.

Values stored in the plurality of latches depending on the results of comparing the threshold voltage of a target memory cell with read voltages R1, R2, R3, R4, R5, R6, and R7 are depicted in the example of FIG. 6. The plurality of latches may include one sensing latch and three code latches. The three code latches may be a first latch, a second latch, and a third latch, respectively. The threshold voltage of the target memory cell in FIG. 6 is assumed to be identical to the threshold voltage of the target memory cell in FIG. 5 in this example, and the code value stored in the code latches has changed to an erase code value 111 depending on a verification pass within a program operation on the target memory cell.

When the memory device 100 receives a recovery command in response to the occurrence of a sudden power-off, '1' may be stored in each of the first latch, the second latch, and the third latch. The memory device 100 may check the code value stored in the code latches of the target memory cell and may store a first value in the sensing latch when the erase code value 111 is stored in the code latches. In an embodiment of the present disclosure, the first value is 1.

The memory device 100 may compare the threshold voltage of the target memory cell with the seventh read voltage R7. Because the seventh read voltage R7 is higher than the threshold voltage of the target memory cell, the code value stored in the code latches may be maintained, and the value stored in the sensing latch may be changed to a second value. In an embodiment of the present disclosure, the second value may be 0. The memory device 100 may sequentially perform an operation including comparing the read voltages lower than the seventh read voltage with the threshold voltage of the target memory cell until the program state of the target memory cell is detected as an erase state or the original code value is determined.

The memory device 100 may perform an operation including changing the value stored in the sensing latch to the first value and comparing the threshold voltage of the target memory cell with the sixth read voltage R6 when the code value stored in the code latches is the erase code value 111. Because the threshold voltage of the target memory cell is lower than the sixth read voltage R6, the memory device 100 may maintain the code value stored in the code latches and may change the value stored in the sensing latch to the second value.

The operation including comparing the threshold voltage of the target memory cell with respective read voltages R1, R2, R3, R4, R5, R6, and R7 may be continuously performed until the fourth read voltage R4 is compared with the threshold voltage of the target memory cell. Until the operation of comparing the threshold voltage of the target memory cell with the fifth read voltage R5 is performed, only the value stored in the sensing latch may be changed, and the code value stored in the code latches may be maintained.

The memory device 100 may maintain the first value stored in the sensing latch and may determine the code value 010 corresponding to the fourth read voltage R4 to be the original code value when the threshold voltage of the target memory cell is equal to or higher than the fourth read voltage R4. The memory device 100 may change the value stored in the first latch and the third latch to 0 and may maintain the value stored in the second latch at 1.

Because the code value stored in the code latches is not the erase code value 111, an operation including comparing the threshold voltage of the target memory cell with the third read voltage R3 may not be performed. The memory device 100 may restore the code value changed due to a verification pass within the program operation to the original code value.

FIG. 7 is a table illustrating when a code value stored in a plurality of latches is maintained according to an embodiment of the present disclosure.

When a recovery operation is not performed depending on the code value stored in code latches is depicted in FIG. 7. When the code value stored in the code latches is not an erase code value, value 111 may be assumed. When '1' is stored in the first latch and '0' is stored in the second latch, the third latch may be assumed.

The memory device 100 may determine the value to be stored in the sensing latch by checking the code value stored in the code latches. Because the code value stored in the code latches is not the erase code value 111, the memory device 100 may store 0 in the sensing latch and may maintain the code value stored in the code latches.

When the code value stored in the code latches is not the erase code value 111, the program operation on the target memory cell may not yet have been completed. Because the program operation has not yet been completed, the memory device 100 may not change the original code value. Because the original code value is not changed, the memory device 100 may skip a recovery operation. The operation of comparing the threshold voltage of the target memory cell with the read voltages R1, R2, R3, R4, R5, R6, and R7 may not be performed.

Figure 8:
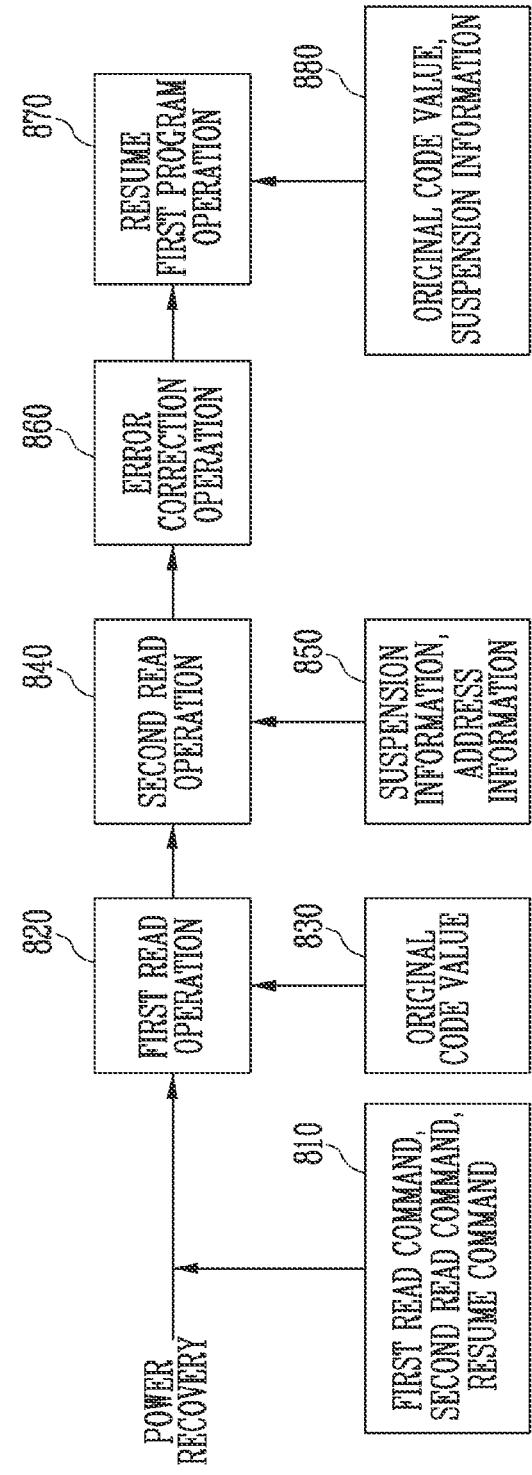
FIG. 8 is a diagram illustrating an operation of resuming a suspended program operation after power recovery according to an embodiment of the present disclosure.

FIG. 8 is a diagram illustrating an operation including resuming a suspended program operation after power recovery according to an embodiment of the present disclosure.

Referring to FIG. 8, after power of a memory system is recovered, a first program operation suspended due to the occurrence of a sudden power-off may be resumed.

A memory controller 200 may output to the memory device 100 a first read command for reading an original code value programmed to a plurality of memory cells in response to power recovery and a resume command 810 for resuming the first program operation, suspended by the suspend command. The memory controller 200 may output a read command for reading suspension information in response to power recovery and address information indicating a position at which the suspension information is programmed into the memory device 100.

The memory device 100 may read 820 the restored original code value 830 from the plurality of memory cells in response to the first read command. The restored original code value is programmed into single-level cells (SLC).

The memory device 100 may receive the address information together with the second read command. The memory device 100 may read 840 the suspension information programmed into the position indicated by the address information 850 in response to the second read command.

The memory device 100 may perform an error correction operation 860 on the read original code value and the suspension information. The error correction operation performed by the memory device 100 may correspond to previously disclosed technology.

The memory device 100 resumes 870 the suspended first program operation based on the original code value and the suspension information 880 in response to the resume command. The memory device 100 may perform the suspended first program operation by continuing the first program operation from its previous point of operation.

Figure 9:
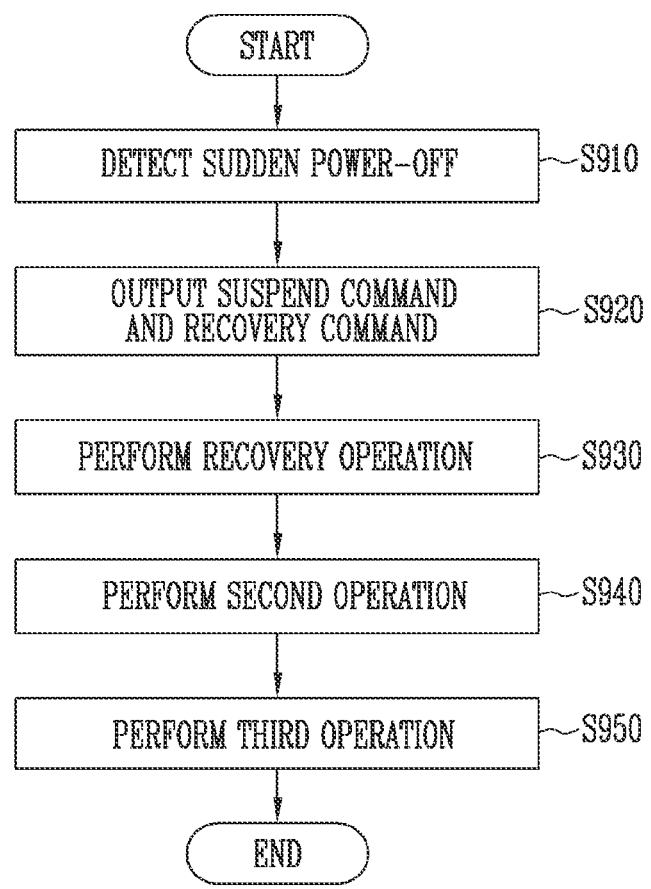
FIG. 9 is a flowchart illustrating a method of programming data in a program operation suspended in response to a sudden power-off according to an embodiment of the present disclosure.

FIG. 9 is a flowchart illustrating an example of a method of programming data in a program operation suspended in response to a sudden power-off according to an embodiment of the present disclosure.

Referring to FIG. 9, a memory system 50 may perform an operation including detecting the occurrence of a sudden power-off, suspending a program operation, and resuming the suspended program operation after power recovery. The memory system may program the plurality of memory cells to restore code values that were changed due to the performance of program operations before the power is turned off due to the sudden power off.

The memory controller 200 detects S910 a sudden power-off occurring in the memory system 50. The memory controller 200 may use a separate device or may independently monitor for a sudden power-off. When the sudden power-off is detected, the memory system does not immediately turn off power to the memory system 50, for example, to protect data and to store information.

The memory controller 200 generates S920 a suspend command for suspending a first program operation of programming multi-bit data to each of memory cells in response to the occurrence of the sudden power-off. The memory controller 200 generates S920 a recovery command for restoring an original code value indicating the multi-bit data changed to an erase code value in response to a verification pass within the first program operation. The memory controller 200 outputs the suspend command and the recovery command to the memory device 100.

The memory device 100 performs S930 a recovery operation including restoring the changed code value to the original code value based on the result of comparing read voltages corresponding to the program states of the corresponding memory cell with the threshold voltage of the memory cell in response to the recovery command, respectively.

The memory device 100 performs S940 an optional second program operation including dividing the restored original code value into 1-bit units and programming the 1-bit units into the plurality of memory cells 110.

The memory device 100 performs S950 an optional third program operation including dividing suspension information related to the suspension of the first program operation into 1-bit units and programming the 1-bit units into the plurality of memory cells 110 in response to the suspend command.

After S950, the memory device 100 may resume the suspended first program operation after power is recovered (not illustrated in FIG. 9). After the sudden power-off, the memory device 100 reads the original code value programmed to the plurality of memory cells 110 depending on power recovery. The memory device 100 receives address information indicating a position at which the suspension information is stored. After the original code value is read, the memory device 100 optionally reads the suspension information.

The memory device 100 may resume the first program operation that is suspended in response to the suspend command. The memory device 100 may resume the suspended first program operation based on the suspension information and the address information.

The example of FIG. 9 may apply to FIG. 4, FIG. 5, FIG. 6, and FIG. 7.

Figure 10:
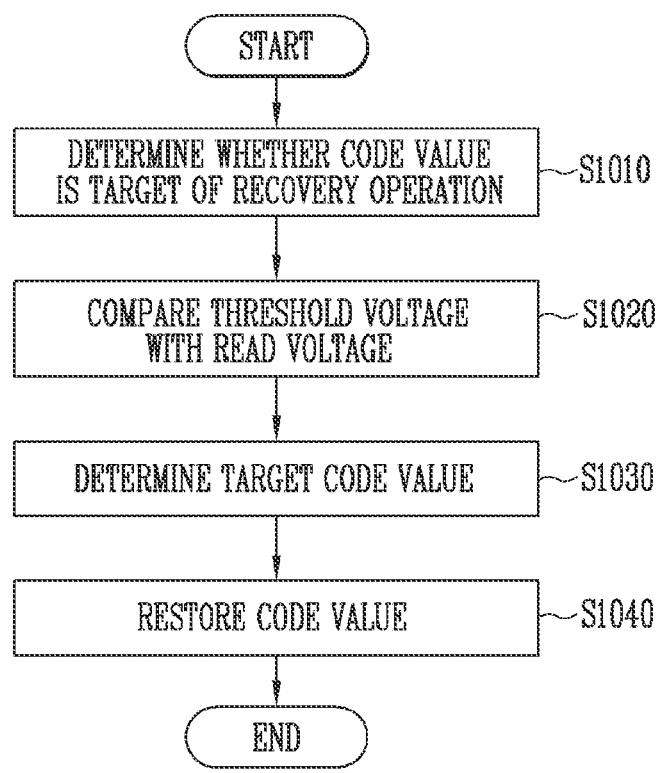
FIG. 10 is a flowchart illustrating a method of restoring a changed code value according to an embodiment of the present disclosure.

FIG. 10 is a flowchart illustrating an example of a method of restoring a changed code value according to an embodiment of the present disclosure.

Referring to FIG. 10, the memory device 100 performs a recovery operation including restoring the changed code value to an original code value based on the result of comparing read voltages corresponding to program states of the corresponding memory cell with the threshold voltage of the memory cell in response to a recovery command, respectively. A plurality of latches that store each code value may include a sensing latch that stores information indicating whether the original code value has changed, and code latches that store the original code value or an erase code value.

The memory device 100 determines S1010 whether the code value is the target of the recovery operation based on the code values stored in the code latches. The memory device 100 stores a first value in the sensing latch when the code value stored in the code latches is identical to the erase code value. The memory device 100 stores a second value in the sensing latch and maintains the code value stored in the code latches when the code value stored in the code latches is different from the erase code value.

The memory device 100 compares S1020 the threshold voltage of a target memory cell in which the code value stored in the code latches is identical to the erase code value with respective read voltages. The memory device 100 maintains the code value stored in the code latches when the threshold voltage of the target memory cell is lower than the read voltage to be compared. The memory device 100 may sequentially compare the read voltages with the threshold voltage of the target memory cell in the order of voltage level until the read voltage lower than or equal to the threshold voltage of the target memory cell is detected.

When the threshold voltage of the target memory cell is equal to or higher than a first target read voltage and lower than a second target read voltage that is higher than the first target read voltage, the memory device 100 determines S1030 a target code value to be a code value corresponding to the first target read voltage.

The memory device 100 restores S1040 the changed code value to the target code value determined based on the result of the comparison.

The flowchart of FIG. 10 may apply to FIG. 4, FIG. 5, FIG. 6, and FIG. 7.

Figure 11:
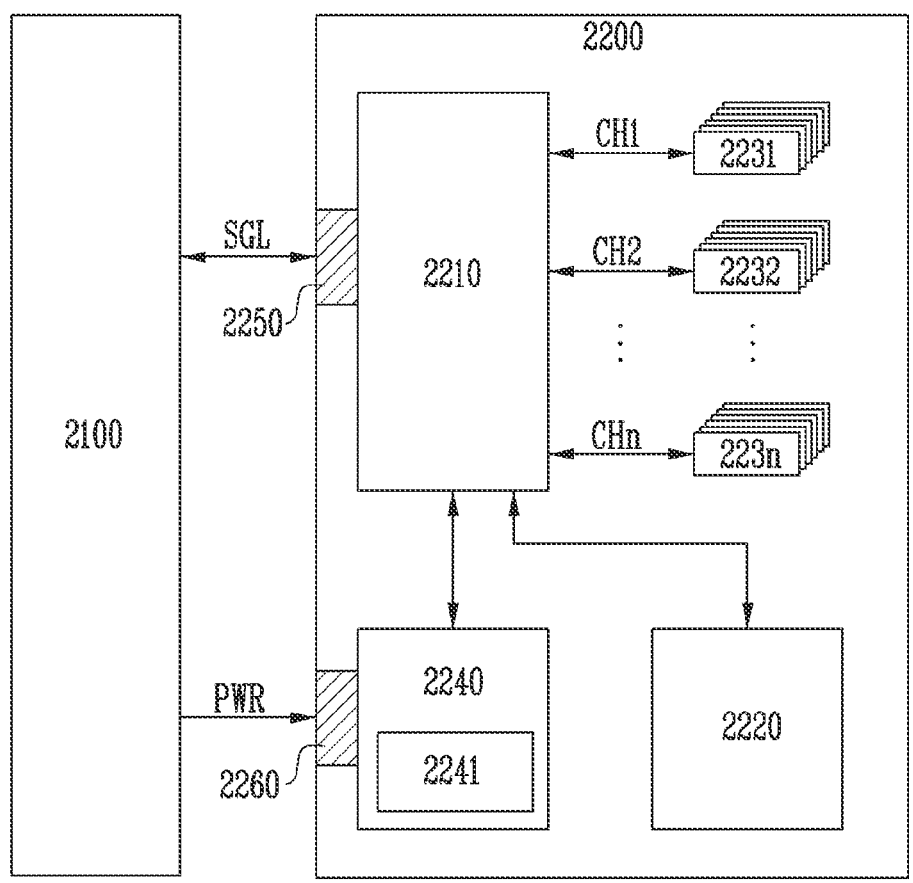
FIG. 11 is a diagram illustrating an example of a data processing system including a memory system according to an embodiment of the present disclosure.

FIG. 11 is a diagram illustrating an example of a data processing system including a memory system according to an embodiment of the present disclosure.

A data processing system 2000 may include a host device 2100 and a solid-state drive (SSD) 2200 in the example of FIG. 11. The above method as described with respect to FIG. 1 through FIG. 10 may apply to an SSD.

The SSD 2200 may include a controller 2210, a buffer memory device 2220, non-volatile memories 2231 to 223n, a power supply 2240, a signal connector 2250, and a power connector 2260.

The buffer memory device 2220 may temporarily store data to be stored in the non-volatile memories 2231 to 223n. The buffer memory device 2220 may temporarily store data read from the non-volatile memories 2231 to 223n. The data temporarily stored in the buffer memory device 2220 may be transmitted to the host device 2100 or the non-volatile memories 2231 to 223n under control of the controller 2210.

The non-volatile memories 2231 to 223n may be used as storage media of the SSD 2200. The non-volatile memories 2231 to 223n may be coupled to the controller 2210 through a plurality of channels CH1 to CHn, respectively. One or more non-volatile memories may be coupled to one channel. The non-volatile memories coupled to one channel may be coupled to the same signal bus and the same data bus.

The controller 2210 may control the overall operation of the SSD 2200. In an embodiment of the present disclosure, the controller 2210 may detect a sudden power-off occurring in the SSD 2200. The controller 2210 may generate a suspend command that suspends a program operation performed in response to detecting occurrence of the sudden power-off and a recovery command for restoring a code value changed by the performance of the program operation. The generated suspend command and recovery command may be output to the SSD 2200.

In an embodiment of the present disclosure, each of the non-volatile memories 2231 to 223n may include a plurality of memory cells. The SSD 2200 may program multi-bit data to each of the memory cells. The SSD 2200 may change an original code value indicating the programmed multi-bit data to an erase code value in response to a verification pass within the program operation. The SSD 2200 may suspend the program operation in response to the suspend command and may perform a recovery operation including restoring the changed code value to the original code value in response to the recovery command. The SSD 2200 may perform the recovery operation based on the result of comparing read voltages corresponding to the program states of the corresponding memory cell with the threshold voltage of the memory cell, respectively.

The power supply 2240 may provide power PWR received through the power connector 2260 into the SSD 2200. The power supply 2240 may include an auxiliary power supply 2241. When a sudden power-off occurs, the auxiliary power supply 2241 may supply power such that the SSD 2200 normally shuts off. The auxiliary power supply 2241 may include large-capacity capacitors capable of charging power PWR sufficient to facilitate suspension and recovery operations.

In an embodiment of the present disclosure, the SSD 2200 may program the restored original code value into each of the plurality of memory cells using power supplied from the power supply 2240 before power is turned off due to the sudden power-off.

The controller 2210 may exchange a signal SGL with the host device 2100 through the signal connector 2250. The signal SGL may include a command, an address, data, and so forth. The signal connector 2250 may be implemented as any of one or more various types of connectors depending on the interface scheme of the host device 2100 and the SSD 2200.

According to the present disclosure, a memory system and a method of programming the memory system are provided, which can resume a suspended program operation after power recovery by restoring a changed code value, stored in a plurality of latches depending on a verification pass within the program operation, to an original code value.

The scope of the present disclosure is defined by the accompanying claims, rather than by the detailed description, and all modifications or changes derived from the meaning and scope of the claims and equivalents thereof should be construed as falling within the scope of the present disclosure.

What is claimed is:

1. A memory system comprising:
a memory device including memory cells for storing data and a plurality of latches for storing code values indicating the data, the memory device configured to program data into each of the memory cells, store an original code value indicating the data in the plurality of latches, and change the original code value stored in the plurality of latches to an erase code value in response to a verification pass; and
a memory controller configured to output, to the memory device, a suspend command for suspending at least the programming in response to detecting a sudden power-off and a recovery command for restoring a code value changed to the erase code value;
wherein the memory device is configured to restore the changed code value to the original code value based on a threshold voltage of the memory cell in response to the recovery command.

2. The memory system according to claim 1, wherein the memory device is configured to restore the changed code value based on a result of comparing read voltages corresponding to program states of the memory cell with the threshold voltage of the memory cell, respectively.

3. The memory system according to claim 2, wherein the memory device is configured to restore the changed code value to a code value corresponding to a first target read voltage when the threshold voltage of the memory cell is equal to or higher than the first target read voltage and lower than a second target read voltage that is higher than the first target read voltage.

4. The memory system according to claim 2, wherein the memory device is configured to sequentially compare the read voltages starting from a highest read voltage with the threshold voltage of the memory cell.

5. The memory system according to claim 4, wherein the memory device is configured to perform a recovery operation until the changed code value is restored or the program state of the memory cell is detected as an erase state.

6. The memory system according to claim 2, wherein:
the plurality of latches comprise a sensing latch configured to store information identifying whether the original code value has changed, and code latches configured to store the original code value or the erase code value, and a quantity of the code latches is determined based on a quantity of bits in multi-bit data.

7. The memory system according to claim 6, wherein the memory device is configured to store a first value in the sensing latch and perform the recovery operation when a code value stored in the code latches is identical to the erase code value.

8. The memory system according to claim 7, wherein the memory device is configured to maintain the code value stored in the code latches and store a second value in the sensing latch when a highest read voltage among the read voltages is higher than the threshold voltage of the memory cell.

9. The memory system according to claim 8, wherein the memory device is configured to compare a second highest read voltage among the read voltages with the threshold voltage of the memory cell when the code value stored in the code latches is maintained.

10. The memory system according to claim 6, wherein the memory device is configured to maintain the code value stored in the code latches and compare the read voltages with the threshold voltage of the memory cell until the read voltages are lower than or equal to the threshold voltages of the memory cell.

11. The memory system according to claim 10, wherein the memory device is configured to restore the changed code value to a code value corresponding to the read voltage lower than or equal to the threshold voltage of the memory cell.

12. The memory system according to claim 6, wherein the memory device is configured to store a second value in the sensing latch and maintain the code value stored in the code latches when the code value stored in the code latches is different from the erase code value.

13. The memory system according to claim 1:
wherein the memory controller is configured to output, to the memory device in response to power recovery after the sudden power-off, a first read command for reading the original code value programmed into the plurality of memory cells and a resume command for resuming at least the programming, suspended in response to the suspend command; and
wherein the memory device is configured to read the restored original code value from the plurality of memory cells in response to the first read command and to perform at least the programming based on the original code value in response to the resume command.

14. The memory system according to claim 1, wherein the memory device is configured to divide suspension information, related to suspension of the programming, into first 1-bit units and programming the first 1-bit units into the plurality of memory cells in response to the suspend command after dividing the restored original code value into second 1-bit units, and programming the second 1-bit units into the plurality of memory cells.

15. The memory system according to claim 1:
wherein the memory controller is configured to output a second read command for reading suspension information and address information indicating a position at which the suspension information is stored to the memory device in response to the power recovery; and
wherein the memory device is configured to read the suspension information in response to the second read command and to resume the suspended programming based on the suspension information and the address information.

16. A method of operating a memory system, the memory system including a memory device including memory cells for storing data and a plurality of latches for storing code values indicating the data the memory device may be configured to program data into each of the memory cells, store an original code value indicating the data in the plurality of latches, and change the original code value stored in the plurality of latches to an erase code value in response to a verification pass, and a memory controller configured to generate a control command for controlling the memory device, the method comprising:
detecting a sudden power-off occurring in the memory system;
outputting, to the memory device, a suspend command for suspending at least the programming in response to detecting the sudden power-off and a recovery command for restoring a code value changed to the erase code value;
in response to the recovery command, performing a recovery operation including restoring the changed code value to the original code value based on a result of comparing read voltages corresponding to program states of each memory cell with the threshold voltage of the memory cell, respectively.

17. The method according to claim 16, wherein:
the plurality of latches comprise a sensing latch configured to store information identifying whether the original code value has changed, and code latches configured to store the original code value or the erase code value, and
performing the recovery operation comprises:
determining whether a code value is a target of the recovery operation based on the code value stored in the code latches;
comparing, with each of the read voltages, a threshold voltage of a target memory cell in which the code value stored in the code latches is identical to the erase code value; and
restoring the changed code value to a target code value determined based on a result of the comparison.

18. The method according to claim 17, wherein the comparing comprises:
maintaining the code value stored in the code latches when the threshold voltage of the target memory cell is lower than the read voltage to be compared; and
sequentially comparing each of the read voltages with the threshold voltage of the target memory cell in an order of voltage level until a read voltage lower than or equal to the threshold voltage of the target memory cell is detected.

19. The method according to claim 17, where the restoring comprises determining the target code value to be a code value corresponding to a first target read voltage when the threshold voltage of the memory cell is equal to or higher than the first target read voltage and lower than a second target read voltage that is higher than the first target read voltage.

20. The method according to claim 17, where the determining comprises:
storing a first value in the sensing latch when the code value stored in the code latches is identical to the erase code value; or storing a second value in the sensing latch and maintaining the code value stored in the code latches when the code value stored in the code latches is different from the erase code value.

21. The method according to claim 16, further comprising dividing suspension information, related to suspension of a program operation, into first 1-bit units and programming the first 1-bit units into the plurality of memory cells in response to the suspend command after dividing the restored original code value into second 1-bit units, and programming the second 1-bit units into the plurality of memory cells.

22. The method according to claim 21, further comprising, in response to power recovery after occurrence of the sudden power-off
reading the original code value programmed into the plurality of memory cells; and
resuming the program operation suspended in response to the suspend command.

23. The method according to claim 22, wherein reading the original code value comprises:
receiving address information indicating a position at which the suspension information is stored; and
reading the suspension information after the original code value is read; and
wherein resuming the program operation comprises resuming the suspended program operation based on the suspension information and the address information.

24. A memory system comprising:
a memory device including a plurality of memory cells for storing data and a plurality of latches for storing code values indicating the data, the memory device configured to perform a first program operation including: programming multi-bit data to each of the memory cells, storing an original code value indicating the multi-bit data in the plurality of latches, and changing the original code value stored in the plurality of latches to an erase code value in response to a verification pass within the first program operation; and
a memory controller configured to output, to the memory device, a suspend command for suspending the first program operation in response to occurrence of a sudden power-off and a recovery command for restoring a code value changed to the erase code value, among code values stored in the plurality of latches,
wherein the memory device is configured to perform a recovery operation including restoring the changed code value to the original code value based on a threshold voltage of the memory cell in response to the recovery command, dividing the restored original code value into 1-bit units, and programming the 1-bit units into the plurality of memory cells.

25. A method of operating a memory system, the memory system including a memory device including a plurality of memory cells for storing data and a plurality of latches for storing code values indicating the data, the memory device configured to perform a first program operation including: programming multi-bit data into each of the memory cells, storing an original code value indicating the multi-bit data in a plurality of latches, and changing the original code value stored in the plurality of latches to an erase code value in response to a verification pass within the first program operation; and a memory controller configured to generate a control command for controlling the memory device, the method comprising:
detecting a sudden power-off occurring in the memory system;
outputting, to the memory device, a suspend command for suspending the first program operation in response to detecting the sudden power-off and a recovery command for restoring a code value changed to the erase code value, among code values stored in the plurality of latches;
performing a recovery operation including restoring the changed code value to the original code value based on a result of comparing read voltages respectively corresponding to program states of each memory cell with the threshold voltage of the memory cell in response to the recovery command; and
performing a second program operation including dividing the restored original code value into 1-bit units and programming the 1-bit units into the plurality of memory cells.

* * * * *